United States Patent [19]
Richardson et al.

[11] 3,948,098
[45] Apr. 6, 1976

[54] VORTEX FLOW METER TRANSMITTER INCLUDING PIEZO-ELECTRIC SENSOR

[75] Inventors: David A. Richardson, Sheldonville; Robert J. Robinson, Lexington, both of Mass.

[73] Assignee: The Foxboro Company, Foxboro, Mass.

[22] Filed: Apr. 24, 1974

[21] Appl. No.: 463,734

[52] U.S. Cl............ 73/194 VS; 324/78 J; 340/186; 340/210
[51] Int. Cl.² G01F 1/32; G01R 23/06; G08C 19/02
[58] Field of Search............... 73/194 B; 324/78 J; 340/186, 210

[56] References Cited
UNITED STATES PATENTS

| | | | |
|---|---|---|---|
| ,209,253 | 9/1965 | Gray | 324/78 |
| ,218,852 | 11/1965 | Scarpa et al. | 73/194 |
| ,575,611 | 4/1971 | Reed | 324/78 X |
| ,600,612 | 8/1971 | Beeken | 73/194 X |
| ,601,707 | 8/1971 | Bauer | 324/78 X |
| ,603,876 | 9/1971 | Grondy | 324/78 |
| ,609,395 | 9/1971 | Jania | 324/78 X |
| ,706,035 | 12/1972 | Hoehn | 324/78 |
| 3,758,858 | 9/1973 | McCue | 324/78 |

*Primary Examiner*—Herbert Goldstein
*Attorney, Agent, or Firm*—Parmelee, Johnson & Bollinger

[57] ABSTRACT

Flow-metering apparatus of the vortex-shedding type wherein an obstruction in a flowing fluid develops a series of vortices which are sensed by a pressure-responsive piezo-electric element to produce an alternating voltage having a frequency corresponding to the fluid flow rate. The piezo-electric voltage signal is processed by electronic circuitry to provide for precise detection of the zero-crossings of the voltage alternations. The resulting frequency signal controls the charge/discharge characteristics of a set of capacitors, with the average charging current corresponding in magnitude to the frequency of vortex shedding. This average current controls an output amplifier in a feedback arrangement to produce a relatively high-powered d-c flow signal over a two-wire transmission line leading to a remote station. In another arrangement, a high-powered pulsating flow signal is developed for transmission over a three-wire transmission line leading to a remote station.

19 Claims, 3 Drawing Figures

Fig. 1

VOTEX FLOW METER TRANSMITTER INCLUDING PIEZO-ELECTRIC SENSOR

BACKGROUND OF THE INVENTION

1. Field of the Invention

This invention relates to industrial process instrumentation, and especially to fluid flow measuring apparatus of the type comprising a flow-transmitter adapted to produce an electrical signal indicating the rate of fluid flow past a vortex-generating obstruction placed in the flow path.

2. Description of the Prior Art

It has been known for many years that vortices are developed in a fluid flowing by a non-streamlined obstruction placed in the fluid flow path. It has also been known that under certain conditions the vortices are alternately shed at regular intervals from opposite edges of the obstruction to form corresponding rows of vortices. Such vortices establish a so-called Karman "vortex street", which is a stable formation consisting of two nearly-parallel rows of evenly-spaced vortices travelling with the flow stream.

In a Karman vortex street, the vortices of one row are staggered relative to those of the other row by approximately one-half the distance between consecutive vortices in the same row. The spacing between successive vortices in each row is very nearly constant over a range of flow rates, so that the frequency of vortex formation is correspondingly proportional to the velocity of the fluid. Thus, by sensing the frequency of vortex shedding, it is possible to measure the fluid flow rate.

Various proposals have been made for such flow measuring apparatus of the vortex-shedding type, and some equipment has gone into commercial use. Commonly, such apparatus comprises a rod-like vortex-shedding obstruction positioned in the flowing fluid at right angles to the direction of fluid flow. The obstruction has in many suggested arrangements been a right-circular cylinder, typically a relatively thin, elongate element as shown for example in U.S. Pat. No. 3,564,915 (FIG. 4). Other shapes have been proposed. For example, U.S. Pat. No. 3,116,639 (Bird), shows in FIG. 10 an obstruction of triangular cross-section positioned with one flat surface facing upstream. In like vein, U.S. Pat. No. 3,572,117 (Rodely) also shows the same triangular cross-section arrangement, and additionally shows a variety of different shapes.

A number of different techniques have been proposed for detecting the shedding vortices so as to develop a flow signal responsive to the shedding frequency. Thermal sensors of the so-called "hot-wire" type (i.e., thermistors, hot films, etc.) frequently have been used in vortex flow meters. The electrical resistance of such sensor elements varies with changes in the cooling rate caused by the passage of the vortices, and this resistance variation is detected by measuring the corresponding changes in current flow through the element.

Such thermal detectors have not been satisfactory for industrial applications. The sensor elements are delicate, and subject to damage or shorting-out. A potential hazard is created because the sensor element must be heated to a temperature above that of the flowing fluid, and because an electrical current must be introduced into the sensor equipment. The output signal is small and difficult to detect without highly complex electronic circuitry.

In addition, the output signal appears as a change-in-level of a non-zero current, and thus inherently presents a problem of separating the variable component from the fixed signal level. The output signal is particularly subject to noise due to cooling effects from sources other than vortices, and also is subject to extraneous variations resulting from changes in ambient conditions. Moreover, the output signal level decreases with increasing vortex frequency, and thus tends to be lost in noise signals at the higher flow rates. Protective coatings on the sensor element are quite thin in order to minimize this effect, but this, in turn, results in undesirably low resistance to wear from the flowing fluid.

As still another approach to the problem, the above-mentioned Bird U.S. Pat. No. 3,116,639 shows a relatively thin vane-like sensing element located downstream of the vortex-shedding obstruction, positioned in alignment with the direction of fluid flow and centrally located so that the spaced rows of vortices pass along opposite sides thereof. This vane-like element is said to oscillate rotatably in a twisting, torsional movement about an axis perpendicular to the fluid flow direction, in response to the pressure fluctuations of the vortices passing thereby. It is also said that the length of the vane, in the direction of fluid flow, should be equal to the vortex spacing in a row of vortices.

Various electrical transducer means are proposed in the above-mentioned Bird U.S. Pat. No. 3,116,639 for detecting the intended rotational movement of the vane, as by sensing with conventional electro-magnetic means the oscillatory twisting motion of a support shaft for the vane. This patent puts forth the notion that the vane it discloses might be made of a piezo-electric material which is strained cyclically by the passage of the vortices along its operative face to produce an alternating voltage. Piezo-electric means also are proposed as fluid-fluctuation detectors in U.S. Pat. Nos. 2,809,520 and 3,218,852. None of these prior disclosures, however, shows a practical flow meter arrangement, and developers of commercially-offered vortex-shedding apparatus have concentrated on other types of detecting devices such as previously described herein including thermal detector devices.

Electronic apparatus has of course been required with thermal detecting devices to amplify the very low pulse signals developed by the small changes in current resulting from the cooling action of the passing vortices. Typically, such electronic apparatus has been quite complex and expensive to manufacture, involving in some cases the provision of sophisticated filtering circuitry to separate the true flow signal from the background noise. The flow signals produced by such electronic equipment generally have not been well suited for industrial instrumentation purposes, and for some applications auxiliary equipment has had to be provided to establish more appropriate signal characteristics.

Accordingly, there has existed a need for improved apparatus for developing flow signals and the like adapted for use in industrial process instrumentation systems. Specifically, there has been need for improved flow-metering apparatus which is mountable directly at the flow pipe carrying the fluid to be measured, and capable of producing an electrical flow signal adapted to be sent for relatively long distances, e.g. over a two-wire transmission line to the control room of a central instrument station.

SUMMARY OF THE INVENTION

In one preferred embodiment of this invention, to be described hereinbelow in detail, a flow-signal transmitter is provided which is capable of being field-mounted along with an associated vortex-shedding flow meter, and which produces an electrical flow signal in the form of a d-c current of suitable power level for transmission over relatively long distances. The transmitter includes as the basic signal-generating device a piezoelectric element which is actuated by the vortex pressure fluctuations so as to produce an alternating voltage at a frequency corresponding to the vortex pressure pulses. This alternating voltage is processed to produce a corresponding sharp-edged square-wave signal which is directed to electronic switch means arranged to control the charge/discharge action of a set of capacitors. The circuitry is so arranged that the average d-c switch current is directly proportional to the frequency of the square-wave signal, and this in turn is directly proportional to the frequency of the vortices sensed by the piezo-electric detector.

This average d-c switch current is smoothed, to remove ripples, and is applied to a summing terminal at the input of an operational amplifier. The output circuit of this amplifier is connected through a feedback resistor to a two-wire transmission line leading to a remotely-located receiving station containing a d-c power supply and a current-sensing element connected together in series with each other and with the transmission line. The operational amplifier continuously adjusts the current flowing through the two-wire transmission line to maintain a pre-set relationship between the feedback signal and the average d-c switch current corresponding to the vortex frequency. Thus the d-c transmission line current sensed at the receiving station corresponds to the fluid flow rate detected by the piezo-electric vortex sensor.

The transmitter includes a reference power circuit energized from the two-wire transmission line and arranged to develop a stabilized reference voltage to supply all required electrical power to the operational amplifier, to the switch-control circuitry for developing the average d-c switch current, and to the signal-processing circuitry for developing the sharp-edged square-wave signal for activating the switch-control circuitry. The transmitter further includes manually-adjustable means for setting the zero level of the d-c output current in the two-wire transmission line, and for setting the "span" of the transmitter (i.e. for setting the amount of output current change for a given change in flow rate). The arrangement is such that the zero and span adjustments are non-interactive, so that a change in either setting does not affect the other. A bias voltage also is derived from the reference voltage to fix the operating region of the operational amplifier at a proper level with respect to the common circuit ground.

Accordingly, it is an object of the present invention to provide improved transmitter apparatus for developing an electrical measurement signal responsive to a process condition such as flow rate of a process fluid. It is a specific object of the invention to provide such transmitter apparatus which produces a signal responsive to a frequency characteristic including the frequency of vortex-shedding in a vortex flow meter. Other objects, aspects and advantages of the invention will in part be pointed out in, and in part apparent from, the following description considered together with the accompanying drawings.

DESCRIPTION OF THE PREFERRED EMBODIMENT

Figure 1:
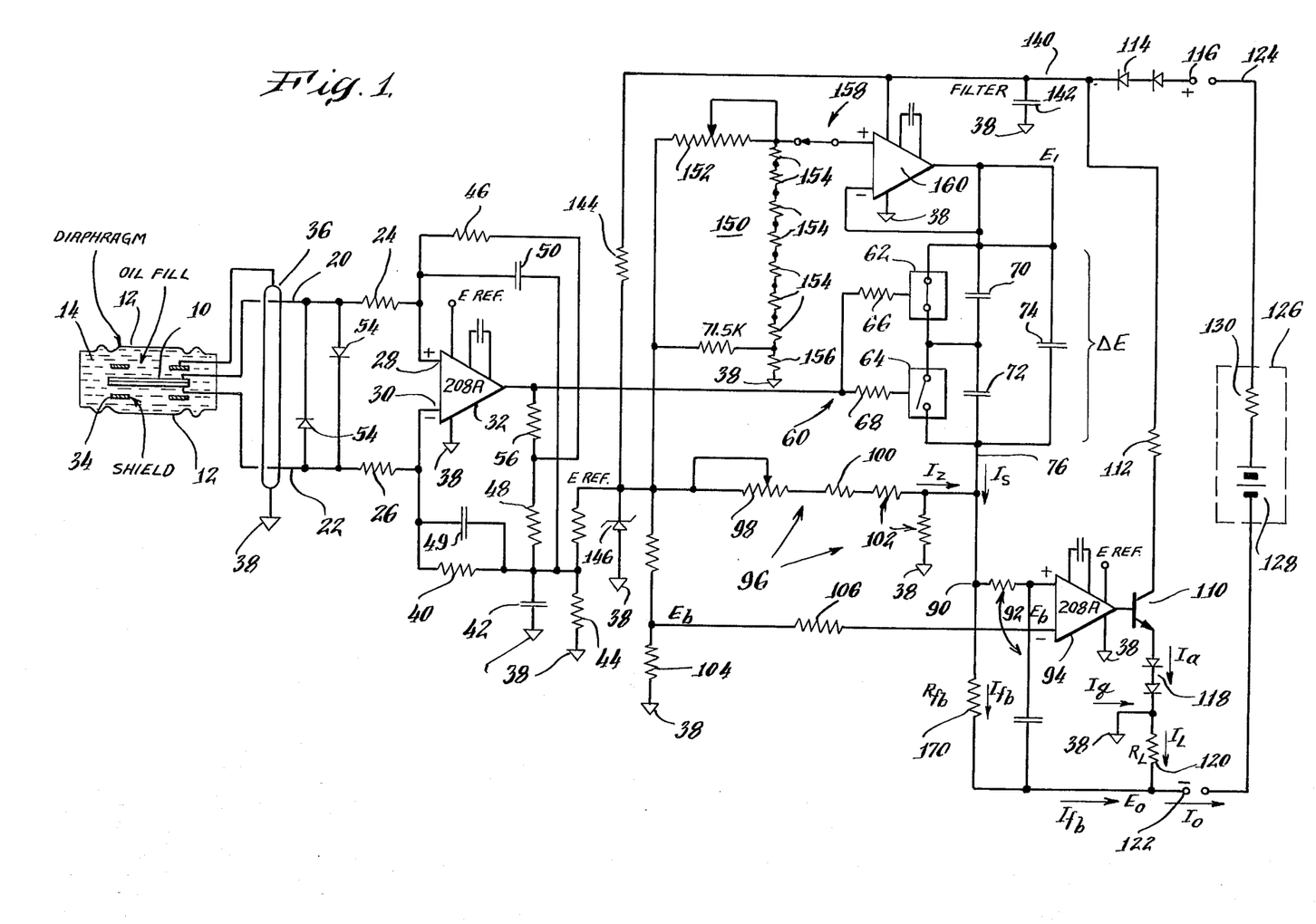
FIG. 1 is a schematic diagram, partly in block form, depicting the electronic circuitry of a transmitter constructed in accordance with the principles of this invention.

Referring now to the left-hand portion of FIG. 1, the flow transmitter in accordance with this invention comprises a piezo-electric element 10 which is adapted to receive pressure pulses from the vortices shed from a vortex-generating plate or the like (not shown) placed in a flowing fluid. As described in more detail in application Ser. No. 463,301 filed on Apr. 23, 1974, by Curran, Sgourakes, and Richardson, this piezo-electric element may be mounted in a sealed capsule having flexible diaphragms 12 responsive to the vortex pressure variations, and including an oil filling 14 which transmits the vortex energy pulses alternately to opposite sides of the element 10.

The piezo-electric element 10 may be a circular ceramic disc having two layers separated by a thin sheet of brass. The outer flat surfaces of the disc are covered with thin films of silver to make electrical connection to the ceramic material. Such ceramic devices are available commercially, under the name Bimorph, from the Vernitron Corporation of Bedford, Ohio.

The element 10 preferably is edge-supported so that the ceramic is flexed by the pressure pulses applied alternately to opposite sides thereof. This "flexure-mode" bending movement produces, in known fashion, alternating positive and negative voltages between the two flat sides of the element 10, approximately in the form of a sine wave about a zero d-c voltage axis. A detailed discussion of the operational principles of such a device are set forth in an article by C. P. Germano in Volume AU-19, Number 1, Mar. 1971, of "IEEE Transactions on Audio and Electroacoustics", at pages 6–12.

Returning now to the description, the two opposite sides of the piezo-electric element 10 are connected by respective leads 20, 22 and respective input resistors 24, 26 to corresponding terminals 28, 30 of an operational amplifier 32 of known design, e.g. the type referred to commercially as 208A. An electrostatic shield 34 desirably is placed around the piezo-electric element to reduce stray capacitance coupling. Ideally, this shield should entirely surround the element, but for practical constructional reasons it may be preferred to use as this shield two thin metallic plates, as illustrated in the drawings, to provide principal protection to the side surfaces of the element which carry the electrical charges. Regardless of the selected physical configuration, this shield is connected to a conductive shield cable 36 which surrounds leads 20, 22 and which, within the instrument housing (not shown), connects to a circuit common lead, generally indicated at 38, appearing at various locations throughout FIG. 1.

The circuit arrangement at the input circuit of amplifier 32 provides electrical symmetry with respect to circuit common 38, to further minimize the effects of any noise signals which might be coupled by stray capacitance into the input leads. For this purpose, lead 22 is connected through input resistor 26 (one megohm) and a second resistor 40 (also one megohm) to a coupling network leading to circuit common 38 comprising a relatively large capacitor 42 (4.7 micro-farads) and a relatively small resistor 44 forming part of a voltage-dividing network to provide bias voltage to the input of amplifier 32. Similarly, lead 20 is connected through input resistor 24 (one megohm), one feedback resistor 46 (one megohm), and a second but quite small feedback resistor 48 (1.5K) to capacitor 42 and bias resistor 44. Equal filter capacitors 49, 50 (0.01 microfarad) are bridged respectively around resistor 40, and around resistors 46 and 48.

The second feedback resistor 48 has an ohmic resistance only 1.5% that of the first feedback resistor 46, so that the former can be disregarded in assessing the coupling characteristics between leads 20, 22 and the circuit common 38. Thus, since resistors 26, 40 and resistors 24, 46 present equal impedances between the corresponding leads 22, 20 and common 38, and since capacitors 48, 50 similarly present balanced impedances, it will be seen that the net impedances presented between leads 20, 22 and common 38 will be symmetrical. This effectively minimizes the effects of any stray capacitance coupling of noise signals into the piezo-electric element 10, or into the connecting leads, from the surrounding flow system and/or other adjacent electrical equipment. Capacitor 42 serves to absorb unwanted signal components developed during the pulse-generating operation of amplifier 32, to be described hereinbelow.

The input circuitry of amplifier 32 also includes a pair of reverse-connected diodes 54 between leads 20, 22, to limit the signal level at the amplifier input to no more than about 0.7 volts positive or negative. As previously noted, the piezo-electric output signal increases with vortex-shedding frequency, and in some arrangements may reach an output as high as 40–50 volts peak-to-peak. The diodes 54 prevent excessive signal excursions from being injected into the amplifier input.

The amplifier 32 is arranged to process the alternating signal received from the piezo-electric element 10 to minimize the effects of any noise signal components and to assure that the positive-to-negative and negative-to-positive transitions of the incoming signal (i.e. the zero-crossings) are sharply defined, thereby to provide for precise detection of the transition times by subsequent portions of the transmitter circuitry. This processing basically is effected by positive feedback action which is set sufficiently high to make the amplifier switch rapidly at each transition time, i.e. to drive the amplifier output to its extreme positive and negative voltages, and to produce a signal "dead band" at the amplifier input. This dead-band at the input minimizes any response of the amplifier to random noise signals on the input leads.

The positive feedback circuitry for amplifier 32 includes the small 1.5K resistor 48, previously mentioned, and a large resistor 56 (1 megohm) connected with resistor 48, as a voltage-dividing network across the output of the amplifier. This divider network develops a proportionately small positive feedback signal which is directed through resistor 46 to the upper (positive) amplifier terminal 30 to augment any amplifier input signal. To explain the overall operation, assume, for example, that the amplifier output is initially at its minimum voltage of −2 volts, so that the feedback voltage will be −1 millivolt. Thus, when the input signal slightly exceeds +1 millivolt, the amplifier output will suddenly switch to its positive maximum output. Assuming that this positive maximum is +3 volts, the feedback signal will then be 1½ millivolts, and the amplifier will remain in its positive saturation condition until the input signal is reduced to a little less than −1½ millivolts, whereupon it will suddenly switch to its negative state. A relatively small dead-band of 2 ½ millivolts thus is provided, which insures quite fast switching substantially at the input-signal zero-crossings, yet provides for de-sensitization of the amplifier to noise signal components which might appear at the amplifier input.

As the amplifier 32 switches back and forth between its extreme output levels, it develops an output signal in the form of a sharp-edged square-wave train of constant voltage height, and having a frequency equal to the frequency of vortex shedding. This square-wave signal is directed from amplifier 32 to a frequency-responsive, controllable current-source, generally indicated at 60, which develops a low-level continuous d-c current signal the magnitude of which is directly proportional to the frequency of the square-wave signal. The means for carrying out this converter function comprises, in general terms, means for developing a series of increments of electrical energy of uniform amount, and means for releasing such fixed-size increments sequentially to an output circuit in synchronism with the alternating signal represented by the square-wave output produced by amplifier 32. Thus, since the rate of release of the electrical energy increments will be directly proportional to the frequency of the square-wave signal, the average d-c current flow involved in such energy release will also necessarily be directly proportional to that frequency.

The controllable current-source 60 is illustrated pictorially in FIG. 1 in schematic block-diagram form as including a pair of switches 62, 64 driven through respective resistors 66, 68 (100K each) by the square-wave control signal so as to control the charge/discharge action of a set of equal-sized capacitors 70, 72. The switches 62, 64 are so arranged that they open and close alternately, in response to the square-wave signal. This is, when switch 62 is closed, switch 64 is open, and vice-versa.

When the first switch 62 closes, it discharges one capacitor 70 and simultaneously completes a circuit to charge the other capacitor 72 to a fixed difference voltage $\Delta E = E_1 - E_b$ (and developed in a manner to be explained subsequently). During this half-cycle of the square-wave signal, the other switch 64 is open. During the next half-cycle, the switches reverse, so that switch 64 discharges capacitor 72 and completes the charging circuit to capacitor 70. A third capacitor 74 is provided to maintain the voltage $\Delta E$ effectively constant during the charging/discharging operations.

This charging/discharging operation of the set of capacitors 70, 72 continues at the frequency of the square-wave control signal, producing a unidirectional flow of switch current down through the return line 76 which serves as the current output line. The higher the frequency, the more frequent are the charge/discharge cycles. In each cycle, each capacitor is always charged up to the pre-set fixed difference voltage $\Delta E$, and is fully discharged at the next switch reversal. Thus, the electrical energy increment represented by the total charge transferred (released) from the two capacitors during each cycle is constant. Accordingly, the average d-c switch current flowing through the current output line 76 is directly proportional to the frequency of the square-wave signal.

The alternately-operable switches 62, 64 are illustrated pictorially in FIG. 1 in order to simplify the presentation and clarify the circuit operation. In a commercial embodiment, any of various specific switch devices could be used for accomplishing this switch function. One arrangement which has been found advantageous in the present instrument arrangement is a known integrated circuit (IC) chip carrying a set of four separately-activatable FET switch sections. This IC device is referred to commercially as the CD4016A Quad Bilateral Switch.

Figures 2, 3:
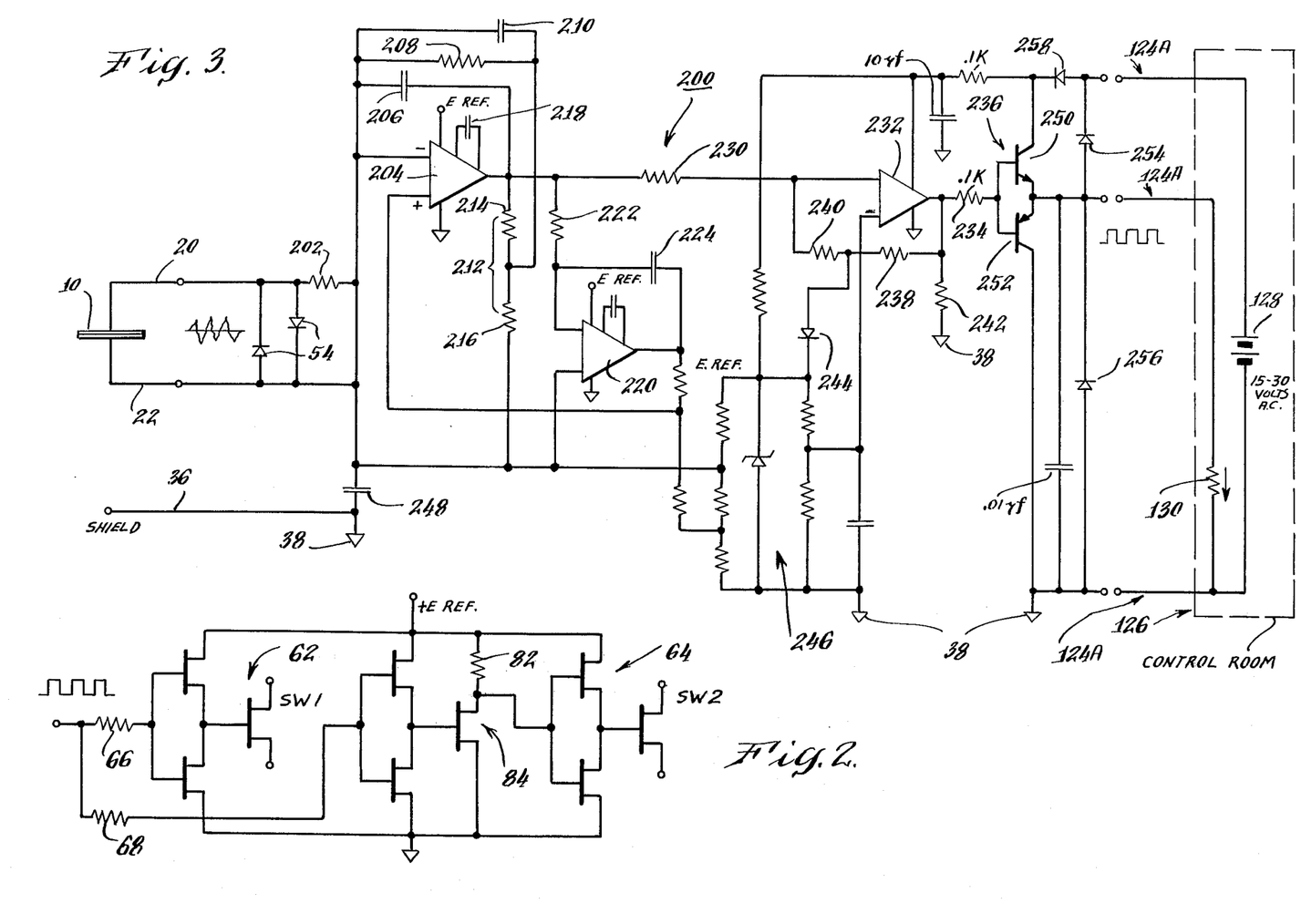
FIG. 2 is a schematic diagram giving certain details of an FET switch circuit suitable for controlling the charge/discharge action of the set of capacitors shown in FIG. 1.
FIG. 3 is a schematic diagram, partly in block form, of an alternate transmitter arrangement for producing a flow signal in the form of relatively high-powered pulses having a frequency corresponding to the flow rate.

FIG. 2 shows, in schematic outline form, three sections of this quad-switch device. (The fourth switch section is unnecessary to the present function and thus has been omitted from the drawing.) Operating power to certain portions of the switch circuitry is provided by the instrument reference voltage $E_{ref}$, the supply circuit for which will be described hereinbelow. The square-wave signal from amplifier 32 is coupled through resistor 66 to the input terminal of the first IC switch section, which serves as the switch 62 to open and close alternately with the highs-and-lows of the applied square-wave signal as previously described with reference to FIG. 1. The second IC switch section also is driven directly by the square-wave signal, applied through resistor 68, but the switch output terminals 84 are connected with a resistor 82 (100K) so that the switch section serves as an inverter, to provide a square-wave output signal which is 180° out-of-phase with the original square-wave signal from amplifier 32. This inverted signal is delivered to the input terminal of the third IC switch section, to cause it to open and close alternately with respect to the first switch section. Thus, the second and third IC switch sections together form the switch 64 referred to in FIG. 1.

The output line 76 from current-source 60 directs the low-level d-c current signal to a summing junction 90 which is connected through an RC smoothing filter 92 to the positive terminal of an operational voltage amplifier 94. This summing junction 90 also receives a zero-set current $I_z$ from a zero current supply comprising a resistance network generally indicated at 96 connected to the reference voltage $E_{ref}$. The resistance network 96 includes a potentiometer 98 connected as a variable resistor of relatively small maximum ohmic resistance (10K), followed by a small fixed resistor 100, which is in turn followed by a 2:1 voltage-divider 102 using relatively large resistors (511K). A second voltage-divider network 104 produces a fixed bias voltage $E_b$ which is directed through a series resistor 106 to the negative terminal of the operational amplifier 94. This bias voltage elevates the input circuit potential to a level providing for proper operation of the amplifier with the available power supply voltage $E_{ref}$ with respect to circuit common 38.

The output of operational amplifier 94 drives a power output transistor 110 (e.g. type 2N1711) which carries the principal component of the transmitter output current. The transistor collector is connected through a power-absorbing resistor 112 (330 ohms) and two series-connected protective diodes 114 to the positive terminal 116 of the instrument. The transistor emitter is connected through two bias-setting diodes 118 and a load resistor 120 (100 ohms) to the negative terminal 122 of the instrument.

The two-wire transmitter output circuit is connected from terminals 116 and 122 to a two-wire transmission line 124 leading to a central station 126, such as a process control room or the like. The central station equipment includes a d-c power supply 128, e.g. of 20–30 volts, and a current-sensing device illustratively shown as a resistor 130. This latter device may, for example, be a chart recording instrument, a process controller, a computational unit, or the like. Power supply 128 and current-sensor 130 are connected in series with each other and with the two-wire transmission line 124.

The transmitter instrument described herein performs the function, basically, of controlling the amount of d-c current which flows from power supply 128 through current-sensor 130 so that this current is directly proportional to the frequency of vortex generation as detected by the piezo-electric sensor 10. In one preferred arangement, the transmitter controlled this output current over a range of from 4 ma to 20 ma, corresponding to a flow rate range of from 0 to about 20 feet/second. The transmitter circuitry which performs this function is powered entirely by current received over the transmission line from the power supply 128.

To provide operating power to the transmitter, a connection is made to positive terminal 116 by a power circuit comprising a lead 140 and a filter capacitor 142 (10 micro-farads). The power lead 140 conducts supply current from terminal 116 through a voltage-dropping resistance 144 to a Zener diode 146. The remote end of this diode is connected to the circuit common 38, and its upper terminal establishes the stabilized reference $E_{ref}$ which is applied to the various power-using circuits as shown in FIG. 1.

One function performed by the reference voltage $E_{ref}$ is to control the capacitor charge voltage $\Delta E$ for the capacitors 70, 72 of the frequency-responsive current-source 60. To provide for adjustability of this charge voltage, so as to permit a change in the "span" of the instrument, the reference voltage $E_{ref}$ is connected to a manually-adjustable resistance network generally indicated at 150. This network includes a variable resistor 152 (10K) followed by a number of series-connected small fixed resistors 154 (ranging down in size from 3.57K to 1.82K) and a final series resistor 156 (20K) connected back to the common 38.

A manually-operable switch 158 provides for selective connection to tap points between the resistors 154, so as to pick off a particular fraction of the available voltage $E_{ref}$. This voltage fraction is connected to the positive terminal of an operational amplifier connected as a buffer amplifier to deliver the selected difference voltage $\Delta E$ (equals $E_1 - E_b$) to the capacitor 74. The arrangement shown gives a supply voltage variation sufficient for changing the instrument span over a range of about 2:1. For example, the 4–20 ma output range of the instrument may correspond to flow rate ranges of between 0–10 feet/second and 0–20 feet/second, depending upon the setting of the network 150.

Although the power circuitry shown for establishing the reference $E_{ref}$ is illustrated as utilizing a series-connected voltage-dropping resistor 144 with a Zener diode 146, it is preferred in a commercial embodiment to use somewhat higher performance voltage-stabilizing circuitry, such as is included in certain available operational amplifiers. For example, an amplifier sold commercially by Teledyne under type number 823A provides a d-c voltage stabilizing circuit comprising a Zener diode in series with a controlled transistor amplifier which automatically adjusts the effective load resistance in series with the Zener diode to obtain a highly stable reference voltage. Such operational amplifier could be used for the buffer amplifier 160, and can provide the reference voltage $E_{ref}$ for the other power-requiring portions of the transmitter described herein.

Referring now to details of the output circuit of the transmitter, the positive end of the load resistor 120 ($R_L$) is connected to circuit common 38, thus producing a negative output voltage $E_o$ at the lower end of that resistor. This negative output voltage is connected through a negative feedback resistor 170 (26.3K) to the summing junction 90. The load current $I_L$ through the load resistor $R_L$ consists of the amplifier current $I_a$ and the quiescent current $I_q$ (flowing from the balance of the circuitry through the common connection 38 at the top of the load resistor $R_L$). The total output current $I_o$ consists of the load current $I_L$ and the feedback current $I_{fb}$. This feedback current $I_{fb}$ typically will be less than 1/1000 the load current $I_L$, and thus can be neglected for simplified calculations involving the output current $I_o$. The quiescent current component $I_q$ varies with temperature, etc., but for the circuit shown will always be less than about 3 ma and usually less than about 1.5 ma. Thus, at the low end of the flow range, i.e. for a transmitter output current of 4 ma, the output transistor 110 carries between about 1 and 2.5 ma of the total current.

In considering the overall operation of the transmitter shown in FIG. 1, it will be evident that the output voltage $E_o = -I_L R_L = E_b - I_{fb} R_{fb}$. Since the load current $I_L$ is essentially equal to $I_o$ (total output current), and since the feedback current $I_{fb} = I_s$ (the signal current) + $I_z$ (the zero current), it can be shown that the output current $I_o = K_1 (I_z + I_s) - K_2 E_b$ (where $K_1$ and $K_2$ are constants determined by the values of certain resistances in the circuit).

It thus is apparent that the output current $I_o$ is determined by: (1) the zero current $I_z$, which establishes the 4 ma zero level, (2) the signal current $I_s$ representing the vortex shedding frequency, and (3) a constant bias term. The bias voltage $E_b$ and the two series diodes 118 in the transistor emitter circuit are required to maintain the operational amplifier 92 in its operative region, since the circuit common 38 is the negative supply voltage for that amplifier.

Referring now to FIG. 3, an alternate transmitter 200 is shown which produces for a three-wire transmission line 124A a square-wave pulse-train signal having a frequency corresponding to that of the vortices shed by the vortex flow meter. This pulse transmitter includes the same basic signal-generating device as shown in FIG. 1, comprising a piezo-electric element 10 and associated elements for delivering an alternating flow signal over leads 20, 22 to the transmitter. A pair of reverse-connected diodes 54 also is provided as before to limit the maximum level of this input signal.

The upper signal lead 20 is connected through an input resistor 202 (1 megohm) to the negative input terminal of an operational amplifier 204 having multiple feedback circuits. One feedback path comprises a 100 pf capacitor 206 connected directly from output to input. A second feedback path comprises paralleled resistor 208 and capacitor 210 (1 megohm and 0.05 micro-farad, respectively) coupled between a voltage-dividing network 212 and the amplifier input. This network 212 includes one resistor 214 of 200K and a second resistor 216 of 1K ohms to produce a feedback signal which is 0.5% of the output signal. The usual small capacitor 218 (30 pf or so) is connected to the amplifier circuit to compensate for various internal interactions, so as to avoid spurious response such as oscillation.

The input amplifier 204 is controlled, as will be explained, so that it operates in its linear range, symmetrically about the true zero level of the input signal. The amplifier thus does not introduce asymmetries, e.g. as it would if drift of the amplifier offset signal caused the input signal to drive the amplifier to saturation in the positive half-cycle of the square wave but not to saturation in the negative half-cycle. The output signal from this amplifier at low levels (i.e. a few millivolts) thus is essentially an amplified identical version of the alternating input signal.

In order to achieve this linear-range operation, the positive input terminal of amplifier 204 is controlled by a d-c feedback signal derived from a second operational amplifier 220 driven by the pulse-train output of the first amplifier. The second amplifier is arranged as a relatively slow integrator, with a series input resistor 222 (100K) and a feedback capacitor 224 (100 microfarads), so that its output is a d-c signal varying only with changes in the zero-frequency (d-c) component of the output signal from the input amplifier 204.

The integrator amplifier 220 thus is essentially nonresponsive to the pulse-train signals of the frequency encountered in the flow-measurement ranges of interest. However, this amplifier is responsive to slowly varying signals, i.e. signals which change over a period of minutes or hours. If, for example, the d-c offset voltage of amplifier 204 changed, due to temperature variations or the like, so as to change the d-c level of the amplifier output signal, there would be a corresponding change in the d-c output level of amplifier 220. This change in d-c level is fed back to the input of amplifier 204 to oppose the effect of the change in offset voltage, and serves to maintain the operation of amplifier 204 in the desired linear range.

The alternating output of amplifier 204 is coupled through a 10K resistor 230 to a power amplifier 232 having its output coupled through an output circuit comprising a small resistor 234 (0.1K) and a transistor switch circuit 236 leading to the three-wire transmission line 124A. The power amplifier 232 is arranged as a bistable flip-flop, by means of a positive feedback circuit including resistors 238 and 240 (47K and 680K). An additional resistor 242 (1K) completes the connection to circuit common 38. A diode clamp 244 is provided to limit the amount of positive feedback to a specific level.

The negative input terminal for the amplifier 232 is biased by a voltage from a resistance network 246 energized by the d-c reference voltage $E_{ref}$. This network also provides d-c bias for the other two amplifiers 204 and 220. These amplifiers may be of the type referred to commercially as type 308, and the power amplifier may be a type 723, also serving to provide the d-c reference voltage $E_{ref}$ as previously described with respect to FIG. 1. A capacitor 248 (100 micro-farads) is connected between the network 246 and the shield lead 36, to assure that the bias level of amplifier 204 remains at the correct value without undesired effects from unwanted signal components.

With an alternating signal at the input of power amplifier 232, the positive feedback action causes its output signal to swing between a first voltage nearby equal to that of the positive voltage furnished by the d-c power supply 128 at the central station 126, and a second voltage corresponding to the potential of the common lead 38. During the half-cycle when the power amplifier output is high, it closes the upper transistor switch 250 and opens the lower transistor switch 252. Thus, current flows through switch 250 into the load resistor 130 at the central station. On the next half-cycle, the upper switch 250 is opened, and the lower switch 252 is closed to reduce to zero the voltage across the load resistor 130, thereby quickly discharging any stray capacitance associated with the transmission line. Accordingly, the transmitter produces sharp-edged pulses of quite large (fixed) amplitude, with the frequency of the output pulses corresponding directly to the frequency of vortex shedding sensed by the piezo-electric element 10. Protective diodes 254, 256 and 258 are provided to prevent reverse-current flow and to minimize any chance of cross-coupling from other nearby transmission lines.

Although specific preferred embodiments of the invention have been described hereinabove in detail, it is desired to emphasize that this is for the purpose of illustrating the invention and to provide sufficient information to enable those skilled in this art to adapt the invention to various applications requiring modifications to the apparatus described hereinabove. For example, although the specification describes a piezo-electric device preferred for generating alternating voltages responsive to the shedding of vortices, it will be understood that in accordance with certain aspects of the invention other means for generating alternating voltages can be used where better suited to particular process applications involving other types of measurements. Also, the three-wire pulse transmitter of FIG. 3 could be modified for two-wire operation, e.g. by placing the load resistor directly in series with the d-c power supply at the control room, and removing the central-wire terminal and line connection. Still other modifications can be made to the disclosed apparatus within the scope of the present invention as limited by the prior art.

What is claimed is:

1. A piezo-electric flow-rate converter for transforming variable-frequency pressure pulses from a vortex-shedding flow meter into a d-c output signal to be transmitted through a two-wire transmission line to a central station which includes, in series between the two wires of said transmission line, a source of d-c voltage and a current-sensing means to produce an effect determined by the magnitude of d-c current flowing through said two-wire transmission line; said flow-rate converter comprising:

piezo-electric means responsive to said pressure pulses to develop a corresponding voltage signal varying in frequency with the applied pressure-pulse frequency;

first amplifier means having an input to which said variable-frequency voltage signal is coupled and including means to produce an alternating control signal at the frequency of said a-c voltage;

controllable current-source means having an input coupled to the output of said first amplifier means to receive said alternating control signal, said current-source means including means to develop a low-level continuous d-c signal current the magnitude of which is directly proportional to the frequency of said control signal;

second amplifier means having an input coupled to the output of said current-source means to receive said low-level continuous d-c signal current, said second amplifier means including an output circuit with first and second output terminals to be connected respectively to the two wires of said two-wire transmission line, said output circuit including current-varying means for controlling the magnitude of a relatively high-level d-c output current flowing through said terminals and powered by said source of d-c voltage;

a feedback resistor forming part of said converter and connected in the output of said second amplifier means to develop a feedback signal responsive to the current flowing through said output circuit terminals;

negative feedback circuit means coupling said feedback resistor to said input of said second amplifier means so as to effect correspondence between changes in the d-c output current flowing through said output terminals and changes in said low-level d-c signal current resulting from changes in the fluid flow rate; and power circuit means coupled to said output terminals to produce, from the electrical power of said source of d-c voltage, d-c supply voltages for said first and second amplifier means and said controllable current-source means.

2. Apparatus as claimed in claim 1, wherein said first amplifier means includes means to produce a sharp-edged square-wave signal as said control signal, and having sharply-defined transitions at the zero-signal axis;

said current-source means further comprising:

capacitor means;

switch means operable by said square-wave control signal alternately between closed and open positions at the frequency of said pressure pulses;

switch circuit means interconnecting said capacitor means and said switch means with said power circuit means to alternately charge and discharge said capacitor means in synchronism with said pressure pulses to produce an average d-c capacitor current flow through said switch means corresponding to the frequency of said pressure pulses; and means connecting said average d-c capacitor current to said input of said second amplifier means to serve as said low-level d-c signal current for controlling the magnitude of said d-c output current.

3. Apparatus as claimed in claim 2, wherein said switch means comprises first and second switches operable alternately by said square-wave control signal;

said first switch meana serving when actuated to connect a voltage from said power circuit means to said capacitor means to charge said capacitor means to a preselected d-c voltage level; and said second switch means serving when actuated to discharge said capacitor means.

4. Apparatus as claimed in claim 1, wherein said first amplifier means includes positive feedback means to produce effective dead-band in the amplifier operation, such that the amplifier output will be driven alternately between its positive and negative saturation levels by a piezo-electric input signal of predetermined small magnitude comparable to that produced at relatively low flow rates but larger than the normal noise level signals encountered, whereby said first amplifier means provides rapid switching yet is relatively insensitive to noise.

5. Apparatus as claimed in claim 4, wherein said feedback means includes a resistance divider-network coupled to the amplifier output to develop a positive feedback signal which is substantially smaller than the amplifier output signal.

6. Apparatus as claimed in claim 5, wherein said feedback means includes means to produce a feedback signal the changes in which are less than one-hundredth the magnitude of the corresponding changes in the first amplifier output signal.

7. Apparatus as claimed in claim 1, including zero-setting means to supply to the input of said second amplifier means a d-c current signal representing a zero level and arranged to produce from the output of said second amplifier means, when the frequency of said pressure pulses is at a predetermined minimum value, an output current in said two-wire line having a pre-set constant level representing a minimum flow rate; and
circuit means coupled to said power circuit means to provide d-c power to said zero-setting means.

8. Apparatus as claimed in claim 7, including span-adjusting means for controlling the amount of change of said d-c output current through said two-wire circuit for a given change in fluid flow rate.

9. Apparatus as claimed in claim 1, wherein said current-source means comprises means responsive conjointly to the level of an applied d-c control voltage and to the frequency of pressure-pulses for producing said low-level d-c signal for said second amplifier means;
means coupled to said power circuit means for producing said d-c control voltage; and
means for adjusting the magnitude of said d-c control voltage to alter the amount of change in said low-level d-c signal for a given change in pressure pulse frequency and provide a span adjustment which does not interact with other adjustments of the transmitter.

10. Apparatus as claimed in claim 9, wherein said span-adjusting means comprises an operational amplifier producing said d-c control voltage;
potentiometer means coupled to said power circuit means to develop a manually-controllable d-c supply voltage; and
means coupling said manually-controllable d-c supply voltage to the input of said operational amplifier to fix the magnitude of said d-c control voltage applied to said current-source means.

11. A field-mountable vortex-meter flow transmitter comprising:
a piezo-electric sensor responsive to the vortex pressure pulses for developing an alternating voltage signal corresponding to the fluid flow rate;
frequency-responsive electronic means having an input to which said alternating voltage signal is directed and including means to develop a low-level continuous d-c current signal the magnitude of which is porportional to the frequency of said alternating voltage;
output power amplifier means;
an output circuit for said power amplifier means, said output circuit including first and second output terminals for connection respectively to the separate wires of a two-wire transmission line leading to a remote area having a d-c power supply and a current-sensing device in series with each other and with said transmission line;
said output power amplifier means including means to control the magnitude of the d-c output current flowing through said first and second output terminals from the d-c power supply at said remote area;
a feedback resistor connected in series with said output circuit and including means to develop a feedback signal responsive to said d-c output current;
summing circuit means connecting said low-level d-c current signal and said feedback signal together to the input of said output power amplifier to develop a composite amplifier input signal representing a comparison of said low-level d-c current signal and said feedback signal, the d-c output current flowing through said first and second output terminals being continuously controlled by said output power amplifier means so that said output current tracks said low-level d-c current signal developed by said frequency-responsive electronic means;
power circuit means connected to said output circuit and including means to supply operating power from said d-c power supply to said frequency-responsive electronic means and to said output power amplifier;
the average d-c current flowing through said first and second output terminals and sensed by said current-sensing device indicating by its magnitude the frequency of said alternating voltage and thereby indicating the flow rate of the fluid being measured by the vortex flow-meter.

12. Apparatus as claimed in claim 11, wherein said output power amplifier means includes a voltage amplifier followed by a power output stage;
said power circuit means comprising means to establish a positive reference voltage with respect to a circuit common;
means connecting said positive reference voltage to said voltage amplifier means to supply energization thereto; and
means connecting a load resistor in the negative potential side of said power output stage, whereby current flows from said output stage through the load resistor and then to the two-wire transmission line.

13. Apparatus as claimed in claim 12, including means connecting the positive potential end of said load resistor to said circuit common so that the potential of the other end of said load resistor is negative with respect to the potential of said circuit common;
said connecting means serving to direct the power circuit means return current through said load resistor, together with the current through said power output stage, to the return line of the two-wire transmission line.

14. Apparatus as claimed in claim 13, wherein said power circuit means includes bias means to establish a positive bias voltage with respect to said circuit common; and means connecting said bias voltage to the input of said voltage amplifier to set its input operational level at a potential above the current common potential of the power voltage supplied to said voltage amplifier.

15. Apparatus as claimed in claim 14, including diode means connected between the positive end of said feedback resistor and the corresponding output terminal of said power output stage, to establish a bias voltage assuring proper operation of said power output stage.

16. Transmitter apparatus for use in industrial process instrumentation systems for developing a d-c measurement signal corresponding to the magnitude of a process condition such as flow rate and suited for transmission over a relatively long transmission line to a remote receiving station having a supply source of d-c voltage to furnish power for developing said measurement signal; said transmitter apparatus comprising:

condition-responsive means comprising a transducer responsive to said process condition and including signal-generating means for developing an alternating voltage having a frequency continuously varying with and proportional to the magnitude of said process condition;

controllable d-c current-source means coupled to the output of said condition-responsive means and responsive to said alternating voltage signal, said current-source means including means for developing uniform-sized increments of electrical energy and for releasing said increments of energy at a rate proportional to the frequency of said alternating voltage signal, whereby to produce a d-c current signal having an average value proportional to the frequency of said alternating voltage signal;

amplifier means having a summing input terminal connected to the output of said current-source means to receive said d-c current signal therefrom;

an output circuit for said amplifier means comprising first and second terminals to be connected respectively to the individual wires of a two-wire transmission line leading to said remote receiving station, said amplifier means output circuit including current-varying means to controllably vary the flow of current from said source of d-c voltage through said transmission line; and a feedback circuit coupling the output of said amplifier means to said summing junction to establish correspondence between said average d-c current and the d-c current flowing in said two-wire output circuit, whereby the current in said two-wire transmission line corresponds to the magnitude of said process condition.

17. Apparatus as claimed in claim 16, wherein said condition-responsive means includes means responsive to the flow rate of a fluid for developing an alternating voltage signal having a frequency corresponding to the fluid flow rate.

18. Apparatus as claimed in claim 17, wherein said signal generating means comprises an element which is physically deflectable at a frequency corresponding to flow rate and includes means to produce an alternating voltage at the frequency of said deflection.

19. Apparatus as claimed in claim 16, wherein said current-source means comprises capacitor means which is chargeable to a predetermined voltage to provide said uniform-sized increments of electrical energy.

* * * * *